April 22, 1952 B. W. FRY 2,594,147
MAGAZINE STRUCTURE FOR ARTICLE DISPENSING APPARATUS
Filed Dec. 13, 1948 10 Sheets-Sheet 1

Benjamin W. Fry,
Inventor,
Haynes and Koenig,
Attorneys.

April 22, 1952          B. W. FRY          2,594,147

MAGAZINE STRUCTURE FOR ARTICLE DISPENSING APPARATUS

Filed Dec. 13, 1948          10 Sheets-Sheet 2

Benjamin W. Fry,
Inventor,
Haynes and Koenig,
Attorneys.

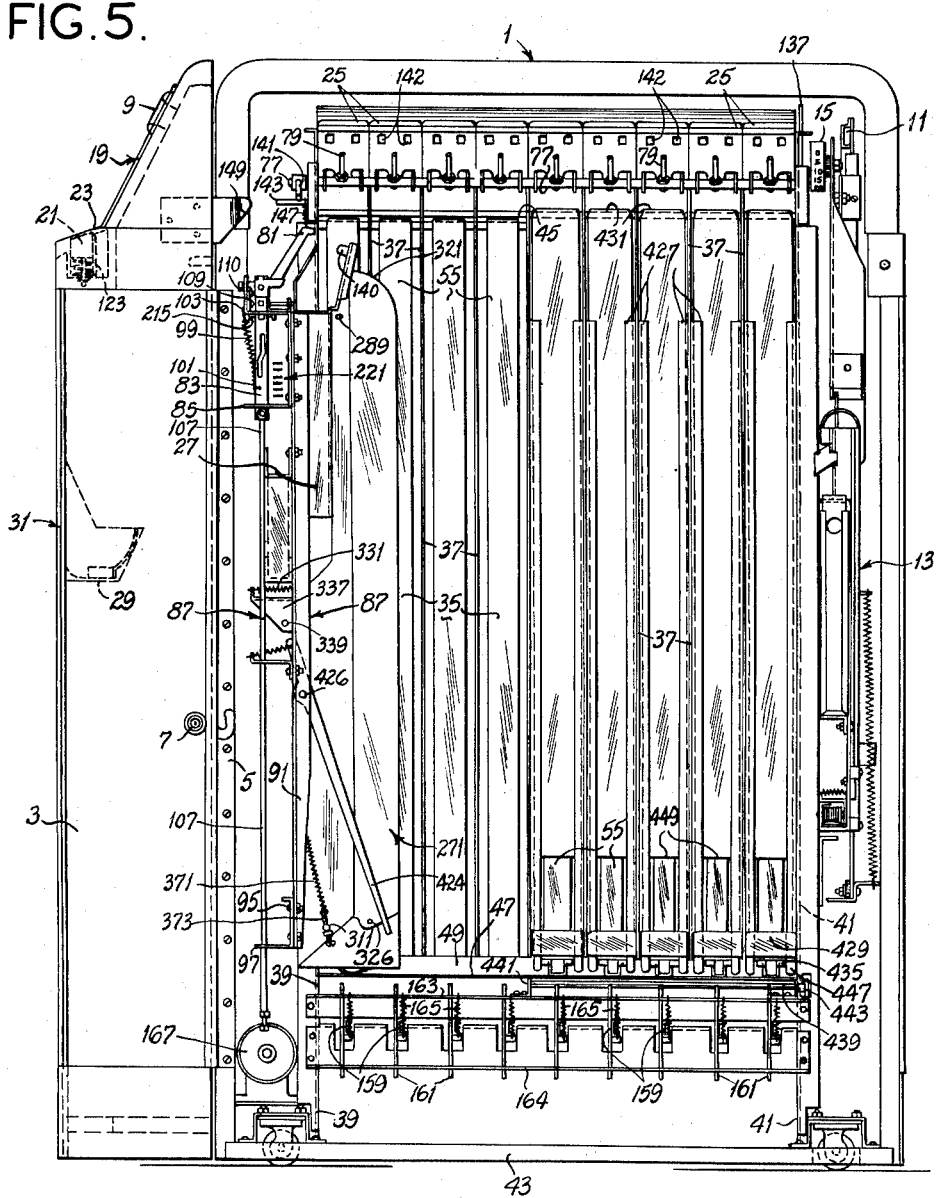

April 22, 1952 — B. W. FRY — 2,594,147
MAGAZINE STRUCTURE FOR ARTICLE DISPENSING APPARATUS
Filed Dec. 13, 1948 — 10 Sheets-Sheet 4

Benjamin W. Fry, Inventor,
Haynes and Koenig,
Attorneys.

April 22, 1952 B. W. FRY 2,594,147
MAGAZINE STRUCTURE FOR ARTICLE DISPENSING APPARATUS
Filed Dec. 13, 1948 10 Sheets-Sheet 5
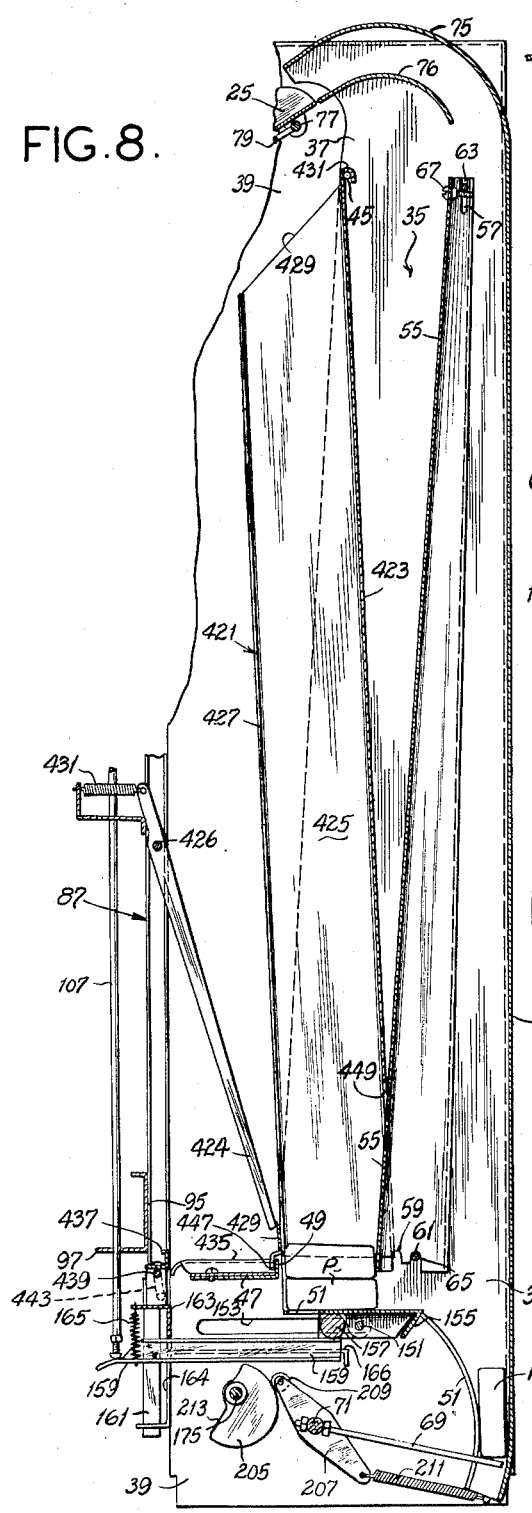
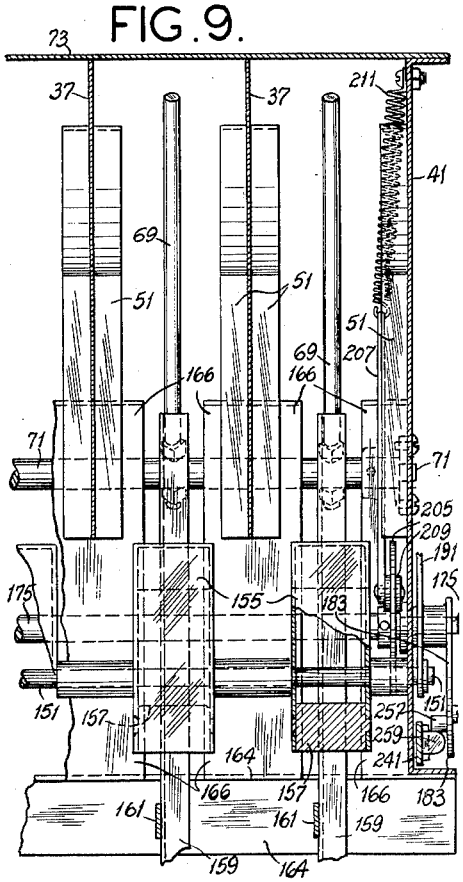
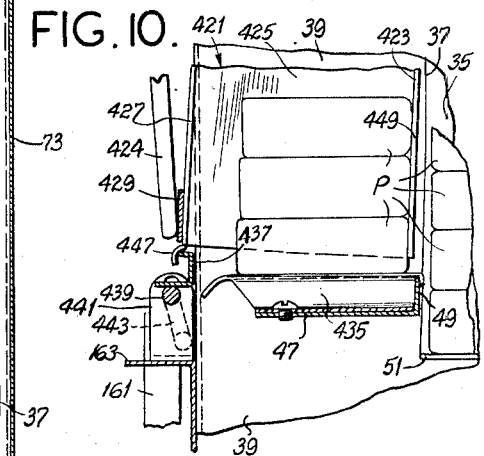
Benjamin W. Fry,
Inventor,
Haynes and Koenig,
Attorneys.

April 22, 1952        B. W. FRY        2,594,147

MAGAZINE STRUCTURE FOR ARTICLE DISPENSING APPARATUS

Filed Dec. 13, 1948        10 Sheets-Sheet 6

Benjamin W. Fry,
Inventor,
Haynes and Koenig,
Attorneys.

April 22, 1952 B. W. FRY 2,594,147
MAGAZINE STRUCTURE FOR ARTICLE DISPENSING APPARATUS
Filed Dec. 13, 1948

Benjamin W. Fry,
Inventor,
Haynes and Koenig,
Attorneys.

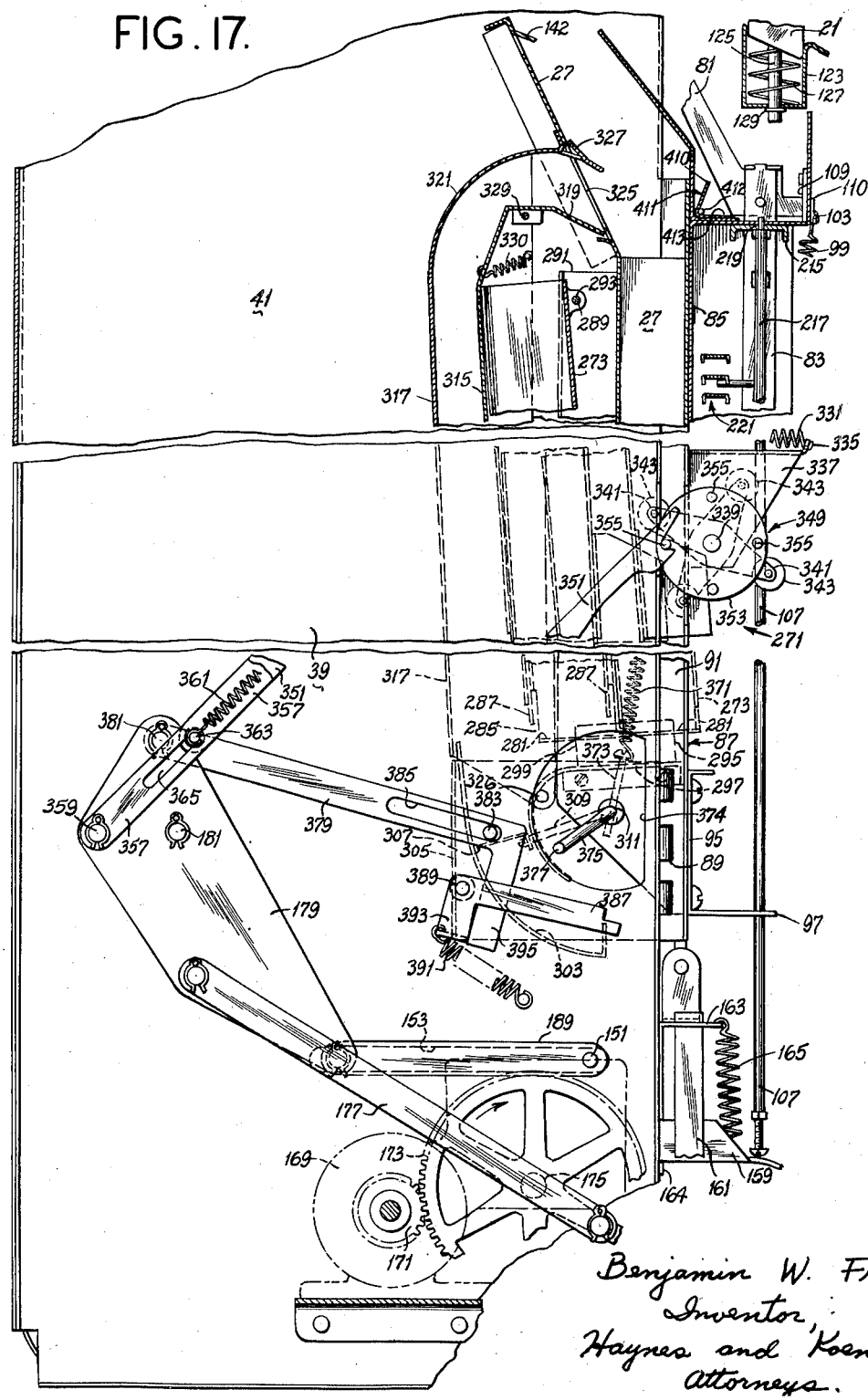

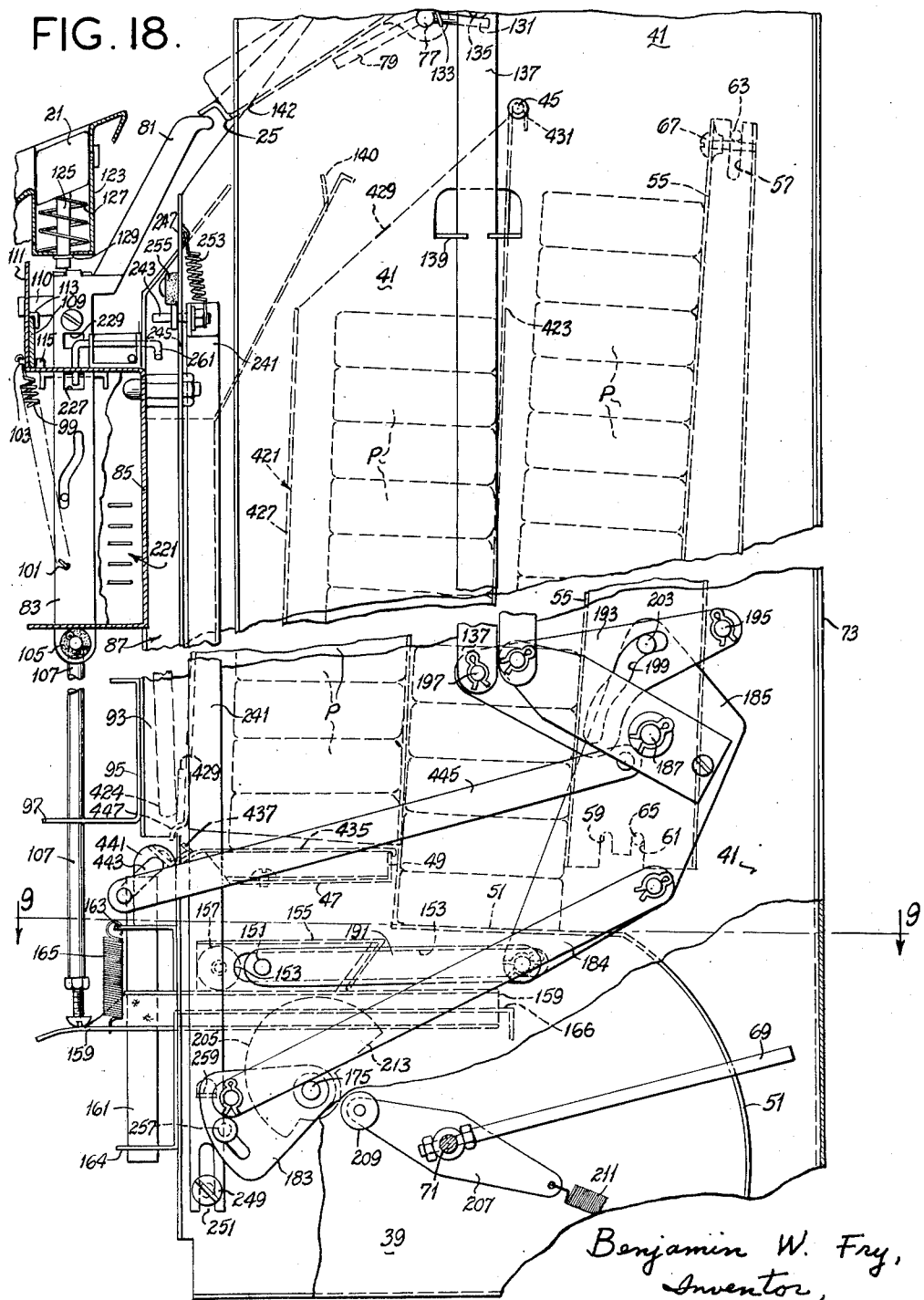

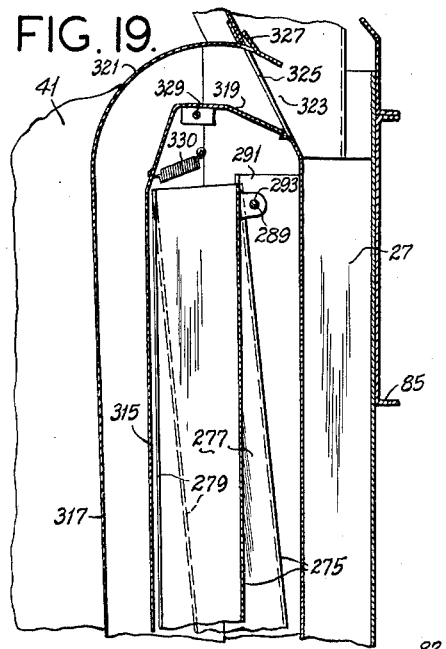
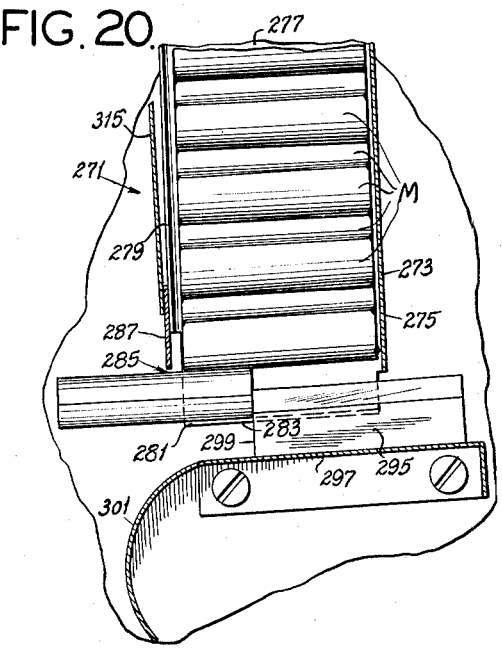
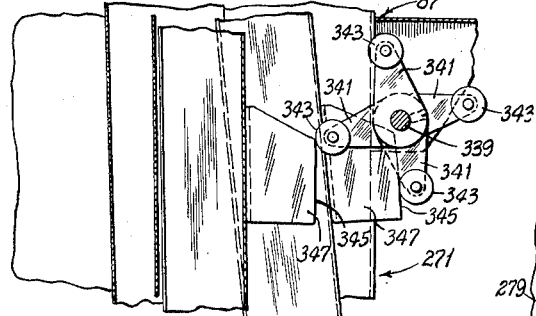
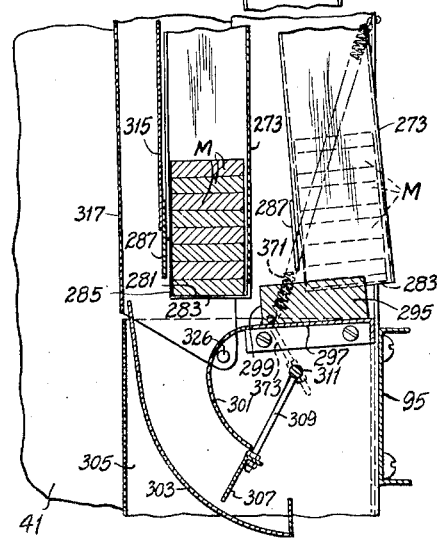

Patented Apr. 22, 1952

2,594,147

UNITED STATES PATENT OFFICE 2,594,147

MAGAZINE STRUCTURE FOR ARTICLE DISPENSING APPARATUS

Benjamin W. Fry, Ladue, Mo., assignor to National Vendors, Inc., St. Louis, Mo., a corporation of Missouri Application December 13, 1948, Serial No. 65,057

4 Claims. (Cl. 312—42)

This invention relates to magazine structure for article dispensing apparatus, and more particularly to magazine structure for use in machines for vending cigarette packages or the like.

Among the several objects of the invention may be noted the provision of improved magazine structure for article dispensing apparatus, particularly for use in machines for vending cigarette packages, and having a large storage capacity for articles to be dispensed; the provision of apparatus of the class described particularly for use in a console model cigarette vending machine of relatively low height adapted to deliver articles at a convenient level for removal by the customer; the provision of apparatus of this class having a large capacity for either standard length or long length ("king size") cigarette packages; the provision of apparatus of this class which may be readily loaded with cigarette packages and which insures loading in such manner that packages will not remain in the machine for overlong periods and become stale; and the provision of apparatus such as described which is economical to construct and reliable in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a front elevation of a cigarette vending machine embodying the invention;

Fig. 4 is an enlarged front elevation of the machine with the front door of its cabinet opened, and with a gate thereof closed;

Fig. 5 is an enlarged elevation of the machine with both the front door and gate opened;

Fig. 8 is a section similar to Fig. 6, with parts broken away, and illustrating moved positions of parts;

Fig. 9 is an enlarged fragmentary detail section taken on line 9—9 of Fig. 6;

Fig. 10 is an enlarged fragmentary detail of Fig. 6, illustrating moved positions of parts;

Fig. 17 is an enlarged view similar to Fig. 14, illustrating moved positions of parts, and with parts broken away;

Fig. 18 is an enlarged section taken substantially on line 18—18 of Fig. 4, parts being broken away;

Fig. 19 is an enlarged vertical section of a match book dispenser, taken on line 19—19 of Fig. 4;

Fig. 20 is an enlarged fragmentary detail of Fig. 19 illustrating a moved position of parts;

Fig. 21 is an elevation of Fig. 20 as viewed from the left;

Fig. 23 is a wiring diagram.

Similar reference characters indicate corresponding parts throughout the several views of the drawings.

Figure 1:
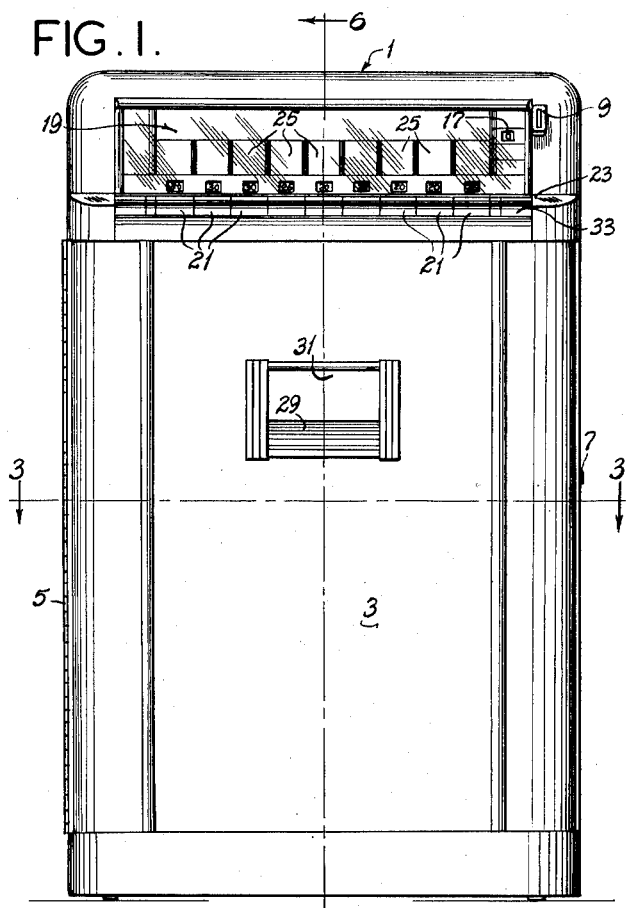
Figure 2:
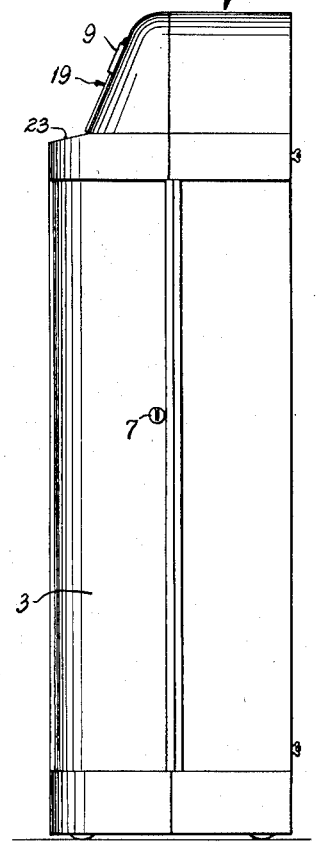
Fig. 2 is a right side elevation of Fig. 1.

The magazine structure of this invention as herein described is particularly adapted for use in a cigarette vending machine for dispensing different brands of cigarettes, in both standard and long length packages, together with a book of matches with each package dispensed. The vending machine is under the control of a coin mechanism including change-making apparatus. The coin mechanism per se, which does not form a part of this invention, is disclosed in my copending application entitled Coin Mechanism, Serial No. 65,058, filed December 13, 1948. It will be understood that the invention is applicable to the dispensing of articles in general, not being limited to the dispensing of cigarette packages and match books, and that many features of the invention may be utilized in vending machines for dispensing miscellaneous articles of merchandise.

Referring to the drawings, the invention is shown to be embodied in a console model cigarette vending machine comprising a cabinet 1 of relatively low height, its top being below eye level. The cabinet has a front door 3 pivoted to swing on a vertical hinge 5 at the left of the cabinet as viewed from its front. At 7 is shown a latch for locking the door in closed position. In the door is a coin inlet 9 for receiving coins of different denominations, the coins dropping through a coin chute 11 to the coin mechanism generally designated 13. The coin mechanism includes a totalizer for registering the total value of coins deposited by a customer including a total amount indicator 15 which may be viewed through a small window 17 in the door adjacent the coin inlet 9. The coin mechanism (including the totalizer) is described in detail in my aforesaid copending application.

The window 17 lies within an opaque portion of a long window 19 which extends across the upper portion of the door. This portion of the door inclines away from a row of push button selector members 21 mounted for vertical movement in a stepped portion 23 of the door. Each push button is in line with a pivoted trap or display tray 25 adapted to carry a package P to be dispensed. As illustrated, there are nine such push buttons and nine such traps or trays for dispensing nine different brands. The packages carried by the trays 25 are visible to the customer through the window 19 so that the customer may select the desired brand. Upon the deposit of coins, and the actuation of a push button, the machine operates through a dispensing cycle wherein the tray 25 corresponding to that push button is tilted to discharge the package P carried thereby into a delivery chute 27, through which it falls and drops into a receiver 29. The receiver is carried interiorly by the door 3 at a level convenient for customers. The door has an access opening 31 through which the package may be removed by the customer, along with a match book which is also dispensed during the dispensing cycle and coins returned in change (if any). At the right end of the row of push buttons 21 is a coin return push button 33.

Figure 6:
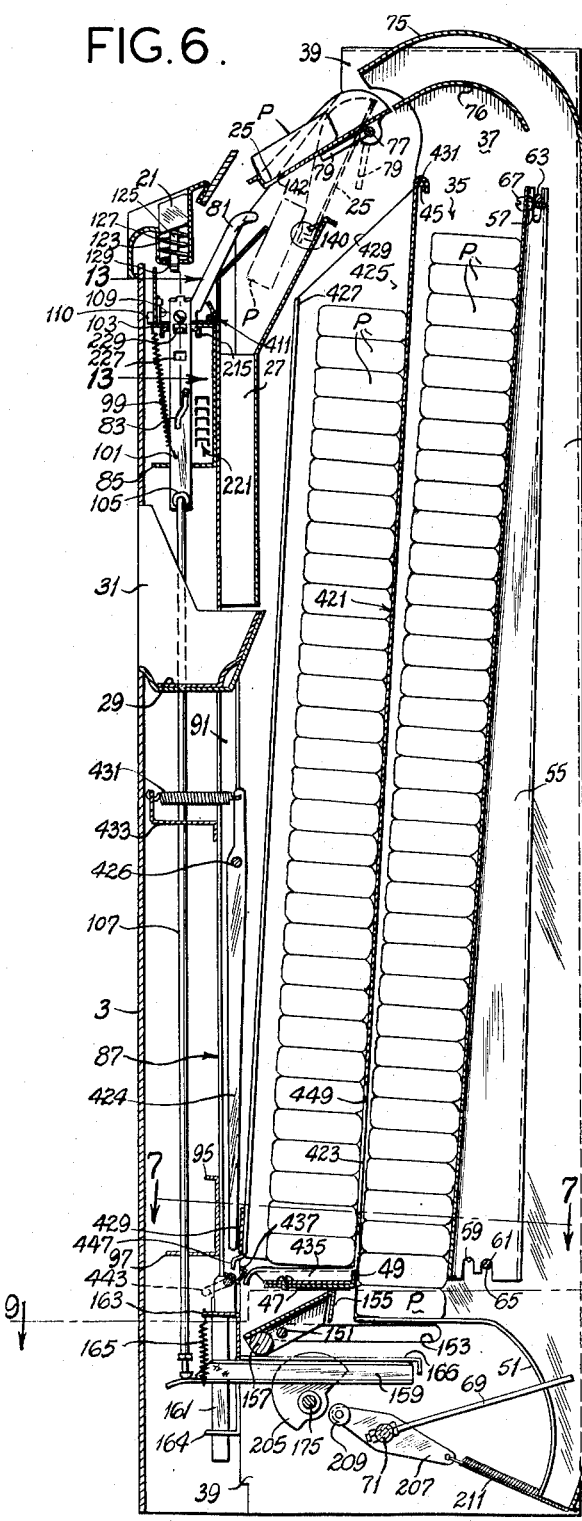
Fig. 6 is an enlarged vertical section taken on line 6—6 of Fig. 1, parts of the cabinet being omitted.

After any tray 25 has tilted to discharge a package P, as indicated by the dotted lines in Fig. 6, it swings back to package-carrying display position, and another package is supplied to it in readiness for a subsequent dispensing cycle from a supply of packages carried in an upright stack in an appropriate primary package magazine 35. There are nine such magazines side-by-side within the cabinet, one for each of the trays. As shown, the magazines are formed by a plurality of vertical partitions 37 located between and parallel to left and right hand vertical side panels 39 and 41. These side panels rest upon the bottom 43 of the cabinet and extend from front to rear within the cabinet. The partitions are spaced at equal intervals between the side panels corresponding to the width of standard cigarette packages. A rod 45 extends from one of the side panels to the other through the upper front corners of the partitions. A plate 47 extends from one of the side panels to the other and has a vertical flange 49 to which the lower front corners of the partitions are secured in any suitable way.

Each magazine 35 is open at its front between the forward edges of the two partitions or the partition and side panel that form the sides of the magazine. Each magazine is adapted to carry a supply of packages flatwise in an upright stack, the stack resting at its lower end upon transversely spaced narrow tracks 51 at the sides of the bottom of the magazine, just below the plate 47. The lowermost package of a stack is adapted to be ejected from the magazine by sliding it rearward on the tracks out of the rear of the magazine. It is desired that each magazine be adapted to hold either standard or long length packages, and that in either case the forward end of the lowermost package in a stack be positioned closely adjacent the flange 49 of the plate 47, with the forward ends of all packages in line, whether they are standard or long length packages. It is also desired that the stack of packages incline slightly from its upper end toward the front of the magazine, rather than being perfectly vertical, to obviate any tendency for the packages to fall out of the magazine. For these purposes, each magazine 35 has an adjustable rear guide member 55 which may be moved between a rearward position for accommodating long length packages and a forward position for accommodating standard length packages. In each of these positions, the guide member inclines downward toward the front of the magazine.

Figure 7:
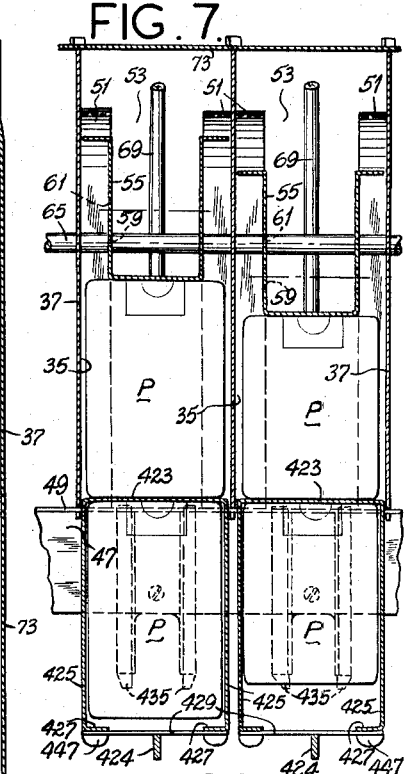
Fig. 7 is an enlarged fragmentary detail section taken on line 7—7 of Fig. 6.
Figure 22:
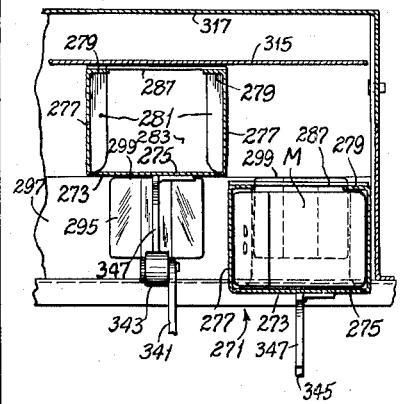
Fig. 22 is an enlarged section taken on line 22—22 of Fig. 14.

Each guide 55 comprises a channel-shaped sheet metal member of a width slightly less than the width of the magazine so that it may move forward and rearward between the sides of the magazine. The sides of each guide are tapered, diverging from its upper to its lower end. In the sides of each guide at its upper end are elongate slots 57. In the sides of each guide at its lower end are forward and rearward notches 59 and 61, respectively. All the guides are supported by upper and lower transverse rods 63 and 65, which extend from the side panel 39 to the side panel 41 through the partitions 37. The upper rod 63 extends through the slots 57 at the upper ends of the guides. When a guide is in its forward position for accommodating standard length packages (Figs. 6–8), the lower rod 65 extends through its rearward notches 61. A screw 67 threaded through the guide extends under the upper rod 63 to prevent upward movement of the guide. By removing the screw, the guide may be lifted, its lower end swung back, and lowered to have rod 65 extend through its forward notches 59. This positions the guide in its rearward position for accommodating king size packages. The screw may then be replaced to prevent upward movement of the guide. Fig. 7 illustrates the different positions of the guide for standard and king size packages. In either case the face of the guide engaged by the rearward ends of the packages is inclined from its upper end toward the front.

Each guide 55 is of such length that its lower end is spaced above the tracks 51 a distance greater than the height of a package but less than twice the height of a package, whether the guide is in its forward or rearward position. Thus, the lowermost package of the stack in a magazine may be slid rearward on the tracks through the resultant discharge opening under the lower edge of the guide and discharged to the rear of the magazine. The tracks curve downward and rearward away from the rear of the magazine, so that as a package slides rearward on the tracks it automatically tilts from its original generally horizontal position to the up-ended position illustrated in Fig. 8. This latter position is determined by engagement of the lower end of the package as it slides down the tracks with a kicker 69. There are nine such kickers, one for each magazine. Each kicker consists simply of a kicker foot extending radially from a kicker shaft 71 which extends transversely of the machine, being journalled in the side panels 39 and 41.

In the course of the dispensing cycle, after a package has been discharged from the lower end of a magazine to the up-ended position of Fig. 8, it is then impelled or catapulted for free travel upward by its respective kicker foot 69. As it shoots upward, it is guided in the guide passage defined by the sides of the magazine from which it has been discharged, the guide 55 of this magazine, and a rear panel 73 which is fixed at its sides to the rearward edges of the side panels 39 and 41. The upper end of the rear panel 73, above the upper ends of the magazines, curves forward and then downward, as indicated at 75. Any package impelled upward by its respective kicker is guided by the curved upper end of the panel and by an inner curved guide plate 76 to travel around the upper end of the magazine from which it was discharged and then downward toward the front of the magazine. As it travels out from between the curved upper end 75 of the panel 73 and the curved guide plate 76, it falls on to the respective tray 25, where it is caught and retained until dispensed upon a subsequent dispensing cycle.

The trays 25 are individually freely pivoted at their upper ends on a transverse shaft 77 journalled at its ends in the side panels 39 and 41. Any one tray may pivot on the shaft independently of all the other trays. The trays are adapted to be retained in a package-catching display position, sloping forward and downward from the shaft 77, by pins 79, one for each tray, extending radially from the shaft, and by fingers 81, one for each tray, which extend upward from the upper ends of slides 83. The latter are mounted for vertical reciprocation in guide slots in the horizontal flanges of a channel 85. This channel 85 forms the upper horizontal member of a gate, generally designated 87, which is pivoted for swinging movement between a closed position in front of the magazines and an open position permitting access to the magazines on hinges 89 carried by the left side panel 39 at its forward edge. The channel 85 opens outward, being connected by its vertical web at its ends to the front of the left and right vertical side members 91 and 93 of the gate adjacent their upper ends. An angle-shaped strut 95, having a forwardly extending horizontal flange 97 directly under the channel 85, is connected at its ends to the front of the side members 91 and 93 adjacent their lower ends.

The slides 83 are biased upward to a retracted position by tension springs 99 connected at 101 to the slides and at 103 to the channel 85 (Fig. 18). Their retracted positions are determined by engagement of collars 105 at the lower ends of the slides with the lower flange of the channel. The collars surround the bent upper ends of push rods 107 linked to the lower ends of the slides and guided for vertical reciprocation along with the slides in guide apertures in the flange 97 of strut 95. Any slide may be pushed downward as in Fig. 6 against the bias of its return spring 99 to push the respective rod 107 downward. Such downward movement is limited by engagement of the lower end of the respective finger 81, at its connection to the upper end of the slide, with the upper flange of the channel 85. As shown in Fig. 4, the push rods 107 in the center are bent to provide a central space accommodating the receiver 29.

Lockout mechanism is provided to prevent more than one slide 83 from being pushed down at a time. As shown more particularly in Figs. 11–13, this mechanism includes a series of lockout plates 109 which are positioned to slide transversely of the apparatus in a vertical plane under the lower ends of forward extensions 110 of fingers 81. The plates 109 are guided for such sliding movement by a vertical flange 111 extending upward from the forward edge of the upper horizontal flange of channel 85, by lugs 113 struck from the flange 111 and bent over the upper edges of the plates, and by lugs 115 struck upward from the upper flange of channel 85. The length of the plates corresponds to the spacing of the fingers 81. The upper corners of the plates are beveled, as indicated at 117. Sliding movement of the plates is limited by left and right end stops 119 and 121 fastened to the flange 111. These end stops are spaced apart a distance equal to the sum of the lengths of all the plates plus a distance slightly greater than the width of a finger 81. The arrangement is such that when any finger 81 is pushed downward, it is driven between two of the lockout plates, thus spreading the plates and taking up the space allotted for sliding of the plates, and thereby preventing any other fingers from being pushed down.

When the gate 87 and the cabinet closure 3 are closed, the slides 83 and fingers 81 are operable by the push buttons 21 as shown in Fig. 18. Each push button is vertically slidable in an upwardly opening channel 123 in the closure 3, being fixed on the upper end of a stem 125 which extends through the bottom of the channel 123 to the inside of the cabinet for operating the respective slide 83. The buttons are biased upward to retracted position by a spring 127, and their upward movement is limited by collars 129 on their stems.

On the right end of the shaft 77 outward of the right side panel 41 is a crank arm 131 (Fig. 18). The shaft is biased to rotate counterclockwise, as viewed from the right, by a spring 133 (shown dotted in Fig. 14) connected between the arm 131 and the side panel 41. The crank arm 131 is biased into engagement with a stud 135 on a vertically shiftable bar 137. The latter is loosely slidable in bearing lugs 139 extending from the side panel 41. The bar 137 is shiftable, by mechanism to be described, upward away from a retracted position wherein stud 135 holds the crank arm 131 against the bias of spring 133 in such angular position that the pins 79 on the shaft 77 hold the trays 25 in display position. When the bar moves upward, the shaft 77 is rotated counterclockwise by the spring 133, thereby swinging the pins 79 downward away from the trays. This permits any tray freely to pivot on the shaft 77 when the respective finger 81 is depressed. As any tray pivots downward, tongues 140 extending forward from the rear wall of the delivery chute 27 reach through openings 142 in the tray, and push the package off the tray.

Figure 14:
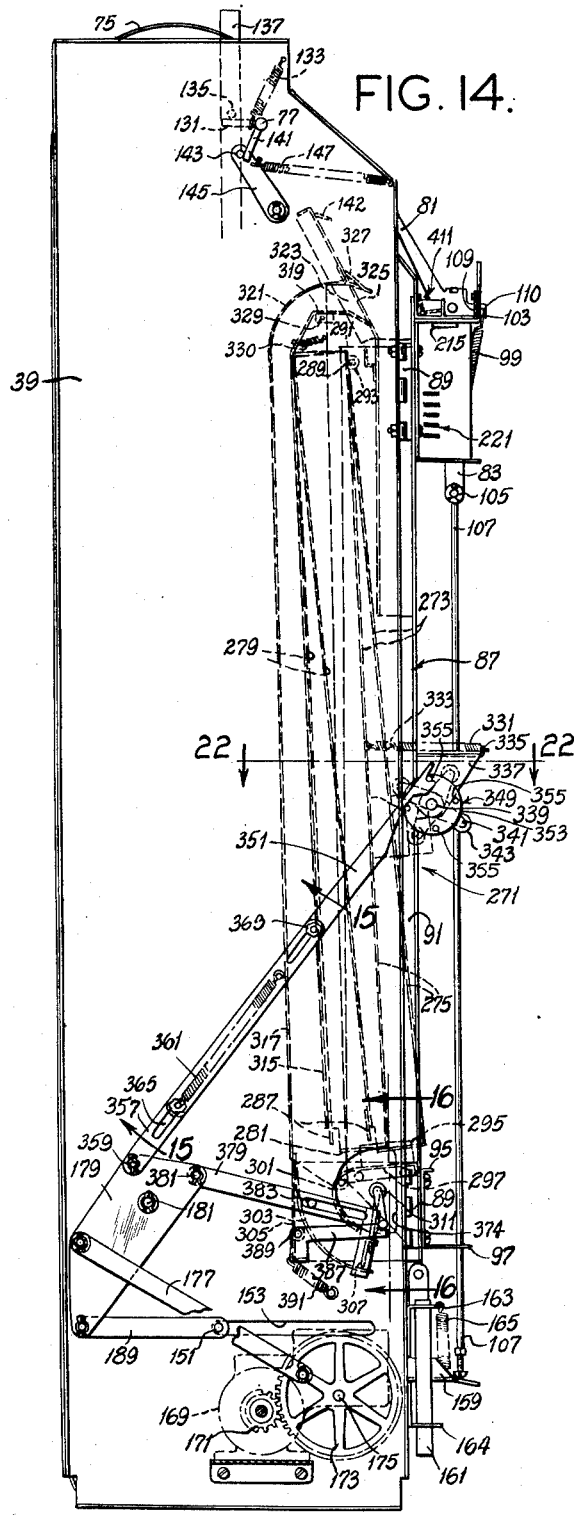
Fig. 14 is a vertical section taken on line 14—14 of Fig. 4.

On the left end of the shaft 77 outward of the left side panel 39 is another crank arm 141 (Fig. 14). This arm 141 is engaged by a stud 143 on a pivoted lever 145 which is biased to rotate clockwise as viewed from the left by a spring 147, in such manner as to bias the shaft 77 to rotate in the opposite direction. On the door 3 is a cam 149 engageable with the stud 143 to hold the latter in a retracted position when the door is closed. When the door is opened, the lever 145 swings forward under the bias of spring 147 to rotate the shaft 77 and to swing the pins 79 and the trays 25 to the position illustrated in Figs. 3 and 4. This is for the purpose of automatically raising the trays for access to the magazines upon opening the door 3.

The mechanism for discharging a package to the rear of a magazine by sliding it rearward on the respective tracks 51 comprises a package discharge rod 151 which extends transversely of the apparatus through elongate horizontal slots 153 in the side panels 39 and 41. This rod is slidable in the slots from a retracted position adjacent the forward ends of the slots toward the rear of the machine in a horizontal plane below the lower ends of the magazines. Pivoted on the rod are pushers 155, one for each magazine. Each pusher is weighted at its forward end by a weight 157 so that its rearward end tends to swing upward to a position wherein it is adapted to engage the forward end of the lowermost package P in the respective magazine (Fig. 6). All the pushers are normally retained in a horizontal position against this gravity bias by means of detent fingers 159, one for each pusher, which are controlled by the push rods 107. As shown, each detent finger 159 is carried by a slide 161 mounted for vertical sliding movement in upper and lower angle-shaped guides 163 and 164 secured at their ends to the front edges of the side panels 39 and 41. The detent fingers extend horizontally rearward from the slides under their respective pushers. They are biased upward to a retracted position for holding the pushers in horizontal position by means of springs 165. The retracted position of the fingers is determined by their engagement with the lower edge of the upper guide bar 163. The forward ends of the detent fingers project beyond the slides for engagement by the lower ends of the push rods 107. When any push rod 107 is pushed downward, it moves the respective detent finger 159 downward, thereby permitting the respective pusher to rock to its tilted package-pushing position under the gravity bias of its weight 157 (Fig. 6). As the pusher tilts, the weight 157 engages spaced tracks 166, upon which it slides as the rod 151 slides rearward.

Figure 3:
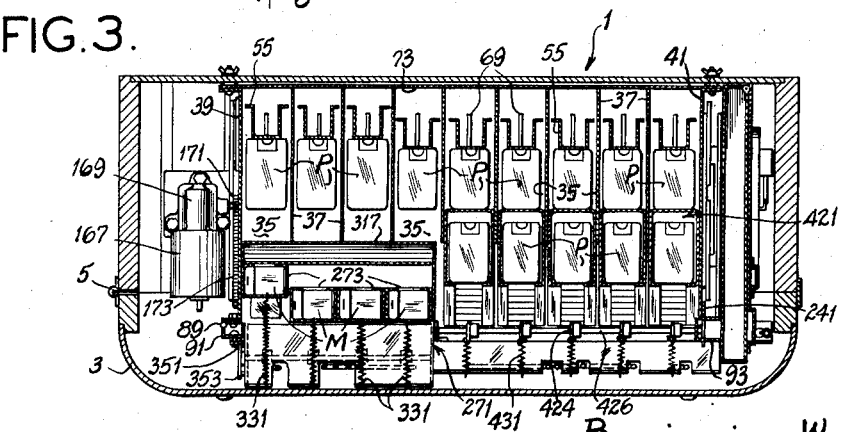
Fig. 3 is a horizontal section taken substantially on line 3—3 of Fig. 1.

Mounted on the left side panel 39 is a motor 167 (Fig. 3). This is coupled to drive the input shaft of a speed reducer 169 having a pinion 171 on its output shaft (Figs. 14 and 17). The pinion is in mesh with a gear 173 fixed on the left end of a transverse shaft 175 journalled in the side panels 39 and 41. The gear 173 is connected by a link 177 to a rocker plate 179 rotary on a stud 181 fixed in the left side panel 39. Fixed on the right end of the shaft 175 extending outward from the right side panel 41 is a crank arm 183 (Fig. 18). This is connected by a link 184 to a rocker plate 185 rotary on a stud 187 fixed in the right side panel. Thus, when the motor 167 is energized, the two rocker plates 179 and 185 are rocked in unison.

The ends of the package discharge rod 151 are coupled to the rocker plates 179 and 185 by links 189 and 191, respectively, in such manner that as the rocker plates are rocked, the rod 151 is moved back and forth in the elongate horizontal slots 153 in the side plates. This moves all the pushers 155 back and forth, but only that pusher whose push rod 107 has been actuated will function to push the lowermost package out of the respective magazine.

The mechanism for shifting the bar 137 is actuated from the right rocker plate 185. It comprises a cam plate 193 pivoted at 195 on the right side panel 41 and having a pivotal connection at 197 with the lower end of the bar. In the cam plate is a cam slot 199. On the rocker plate 185 is a stud carrying a roller 203 which travels in the slot. The arrangement is such that during the initial phase of the dispensing cycle, the bar 137 is moved upward from its retracted position wherein it holds the trays 25 in display position to permit any tray to be released.

The kicker shaft 71 is controlled by a pair of cams 205 fixed on the shaft 175 interiorly of and adjacent the side panels 39 and 41 (Fig. 18). The kicker shaft 71 carries cam follower levers 207 having cam follower rollers 209 engageable with the peripheries of the cams. Biasing springs 211 maintain the follower rollers in engagement with the cams. The latter are of such development as to maintain the kicker shaft and its kickers 69 in the retracted position illustrated in Fig. 8, with the springs heavily loaded, for about half a revolution of the cams. They have a quick-return cam portion 213 for quickly releasing the cam followers thereby to cause the kickers to snap upward from their retracted position under the bias of springs 211 for kicking purposes.

Figure 11:
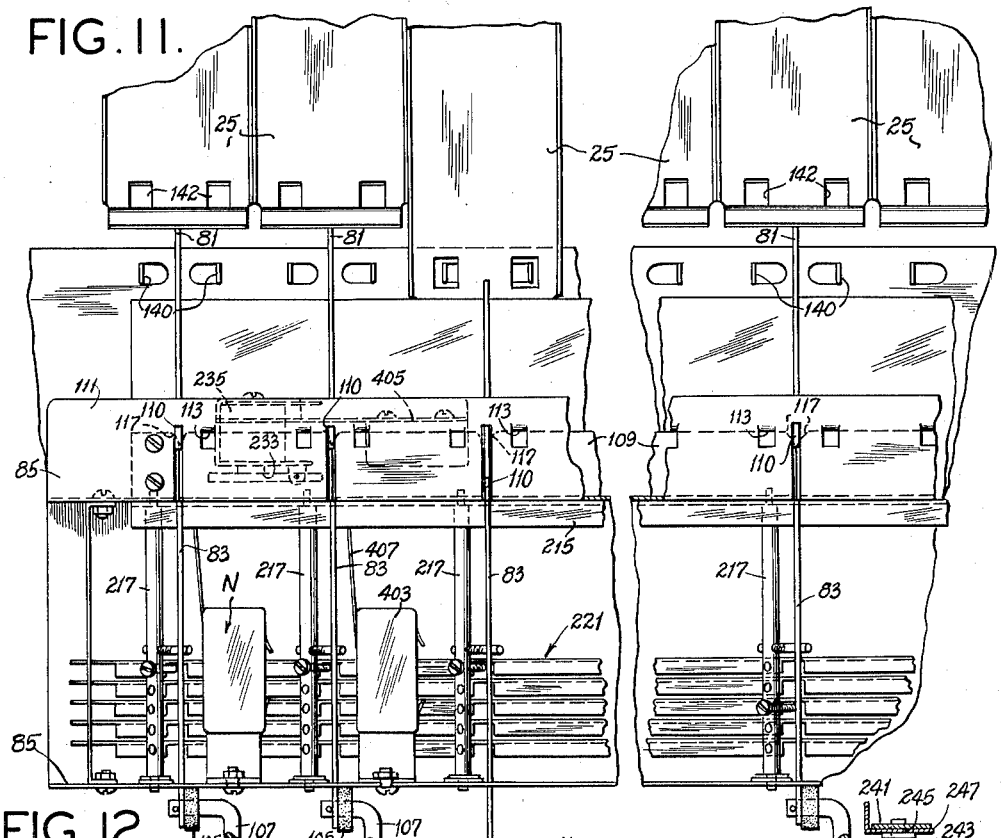
Fig. 11 is an enlarged fragmentary front elevation of a lock bar mechanism, parts being broken away.
Figure 12:
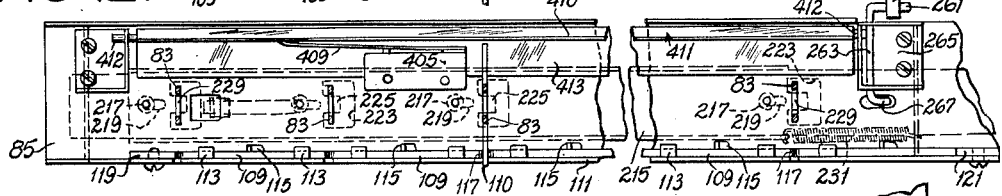
Fig. 12 is a plan of the lock bar mechanism, parts being shown in section.
Figure 13:
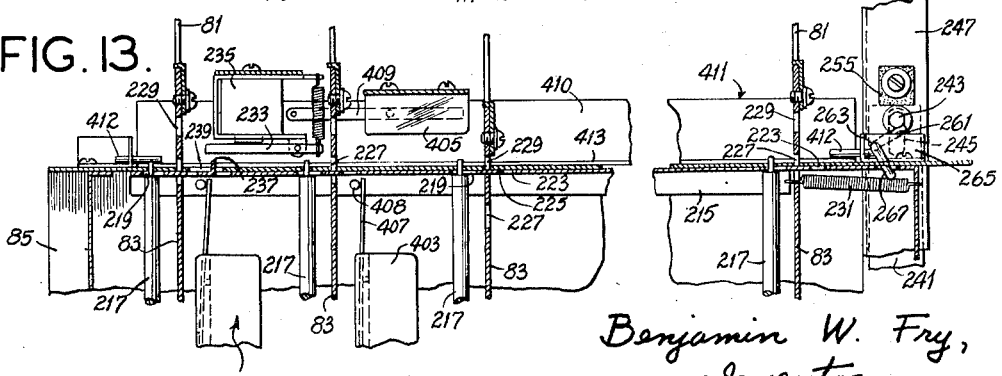
Fig. 13 is a vertical section taken substantially on line 13—13 of Fig. 6.

Locking mechanism is provided for holding down any one of the slides 83 and the associated push rod 107 upon depression thereof so that the push button 21 therefor may be released. As shown in Figs. 11-13, this mechanism includes a lock bar 215 mounted to slide transversely of the machine under the upper flange of the channel 85. The lock bar is guided for sliding lengthwise movement by vertically positioned rods 217 having trunnions journalled in the upper and lower flanges of the channel 85. The upper trunnions of these rods extend through elongate lengthwise slots 219 in the bar. The rods 217 are elements of a price-setting mechanism, generally designated 221, which will not be particularly described since it does not form a part of the invention herein. It is disclosed in my aforesaid copending application. The slides 83 extend through apertures 223 in the lock bar. The latter is formed with tongues or detents 225 extending into the apertures 223 from the left to the right. These detents are so positioned that they may enter lower apertures 227 in the slides when the latter are in raised position or upper apertures 229 in the slides when the latter are depressed.

The lock bar is biased toward the right to bias the detents toward entering the apertures in the slides by means of a spring 231. It is adapted to be retained in a retracted position wherein the detents are retracted to the left of the slides by means of a relay-controlled latch 233. This latch is mounted on the upper flange of the channel 85 and is controlled by a relay coil 235. The lock bar is provided with a finger 237 which reaches up through an aperture 239 in the upper flange of the channel 85 for engagement with the latch. When the coil 235 is deenergized, the latch is lowered for engagement behind the finger to retain the lock bar in retracted position. When the coil is energized, as occurs during a dispensing cycle, the latch is released and the lock bar moves to the right under the bias of the spring 231 to slide-locking position (Figs. 12 and 13).

The lock bar remains in slide-locking position until the termination of a dispensing cycle, whereupon it is driven back to the left to its retracted position by a return mechanism actuated by the crank arm 183 on the right end of the shaft 175. This mechanism comprises a vertically shiftable bar 241 guided for vertical sliding movement on the outside of the right side panel 41 by a stud 243 which extends forward from the upper end of the bar through an elongate vertical slot 245 in an outwardly extending flange 247 at the forward edge of the side panel, and by a bolt 249 extending into the side panel through an elongate vertical slot 251 in the lower end of the bar. The bar is biased by means of a spring 253 to a raised retracted position, determined by engagement of the stud 243 with a rubber stop 255 at the upper end of the slot 245 (Fig. 13). It is adapted to be pulled downward, and then suddenly released to be returned to its retracted position under the bias of the spring 253, by a stud 257 on the crank arm 183 engageable with a finger 259 on the bar adjacent its lower end. As the crank arm rotates (counterclockwise as viewed from the right) the stud 257 comes into engagement with the finger 259, pulls the bar down against the bias of the spring 253, and then rides off the finger, whereupon the bar snaps upward to its retracted position.

As the bar 241 is moved downward, the stud 243 at the upper end of the bar engages a crank arm 261 at one end of a crank shaft 263 journalled in a bearing bracket 265 mounted on the upper flange of the channel 85 (Figs. 12, 13 and 18). At the other end of the crank shaft 263 is another crank arm 267 which reaches downward through an aperture in the flange for engagement with the right end of the lock bar 215 (Fig. 13). The arrangement is such that as the stud 243 moves downward, it rocks the crank shaft clockwise (as viewed from the front of the machine) to cause the crank arm 267 to drive the lock bar 215 to the left.

A match book dispenser, generally designated 271, is carried by the gate 87 at the left side thereof. It swings outward with the gate when the gate is opened. It comprises a plurality of magazines 273 (four being shown) for holding a supply of match books M in a plurality of upright stacks (Figs. 19–22). Each magazine comprises an elongate upright receptacle of such size as to accommodate a stack of match books disposed flatwise, and having a front wall 275, side walls 277 and inturned flanges 279 at the rearward edges of the side walls. The side walls extend below the lower edges of the front wall 275 and the flanges 279. At their lower ends, the side walls have inturned stack-supporting flanges 281 which extend from the front to the rear. The slot between these flanges is designated 283. It leads to a transverse discharge opening 285 in the lower rear of the magazine defined by the stack-supporting flanges 281 and a member 287 secured across the lower ends of the flanges 279. This opening is just high enough to permit only the lowermost match book in the stack to be discharged.

The match book magazines 273 are pivotally suspended for swinging movement on a horizontal transverse rod 289 mounted at its ends in the left vertical side member 91 of the gate and in a vertical frame plate 291 carried by the gate (Figs. 4 and 5). The rod extends through lugs 293 which extend forward from the front walls of the magazines adjacent their upper ends. It is located just rearward of the delivery chute 27, which is carried at the upper end of the gate on the back of the channel 85. The magazines are swingable back and forth for cooperation with fixed match book discharging abutments 295, one for each magazine, mounted on a platform 297 in such position as to extend into the slots 283 in the lower ends of the magazines as they swing forward. The platform 297 spans the member 91 and the frame plate 291. As the lower end of a magazine swings from a position rearward of its respective abutment toward the front of the machine, the lowermost match book in the magazine comes into engagement with the rear face 299 of the abutment as shown in Fig. 20. Then, as the magazine completes its forward swing, this match book is held against movement and discharged from the magazine through the discharge opening 285. With the lower end of the magazine over the abutment, the stack of match books is supported by the abutment (Fig. 19). When the magazine swings away from the abutment, the stack drops down onto the stack-supporting flanges 281.

A match book discharged as above described from any magazine drops into a curved chute defined by a curved forward wall 301 extending downward from the rear of the platform and a curved rearward wall 303 carried by a bracket 305 fixed to the member 91 and the frame plate 291. Movable in this chute is a kicker plate 307 mounted on the ends of arms 309 which extend radially from a kicker shaft 311 through slots 313 in the wall 301. The shaft 311 is journalled in the number 91 and the frame plate 291. The kicker shaft is operable by mechanism to be described to snap the kicker plate upward from a lower retracted position to impel a match book in the chute upward from the chute. As the book travels upward, it is guided between forward and rearward guide panels 315 and 317. The upper ends of these panels curve forward around the upper ends of the magazines, as indicated at 319 and 321, respectively, and define an outlet 323 which leads to the delivery chute 27 through an opening 325 in the rear wall of the delivery chute.

The rear panel 317 carries the forward panel 315 and is pivoted at its lower end as indicated at 326 to the sides of the bracket 305 so that it may be swung open, when the gate 87 is opened, to permit access to the match book magazines for loading them with match books. In the closed position of the rear panel, its upper end 321 extends forward through the opening 325 in the rear wall of the delivery chute. On its upper end is a detent 327 for latching engagement with the rear wall of the chute. By pressing down the upper end of the rear panel, which is sufficiently resilient for the purpose, the detent may be disengaged and the panel swung back. The forward panel 315 is pivoted at 329 within the rear panel and biased forward away from the rear panel by springs 330 so that it swings forward when all the magazines are in forward position to provide a guide passage between the panels wide enough for travel of the match book.

The match book magazines 273 are biased to swing forward by tension springs 331 connected at 333 to the front walls of the magazines and at 335 to a bearing bracket 337. The latter is carried between the gate member 91 and frame plate 291. In it is journalled a transverse crank shaft 339. On this shaft are four crank arms 341, one for each magazine, phased at 90° intervals. These carry rollers 343 at their outer ends engageable with the forward edges 345 of follower plates 347 extending forward from the front walls of the magazines. Upon each quarter-revolution of the crank shaft 339 clockwise as viewed from the left, one of the rollers 343 engages the respective follower plate and swings the respective magazine rearward against the bias of the respective spring 331. As the crank shaft completes a quarter-revolution, the roller rides off the edge, and the magazine is moved forward by the spring.

Figure 15:
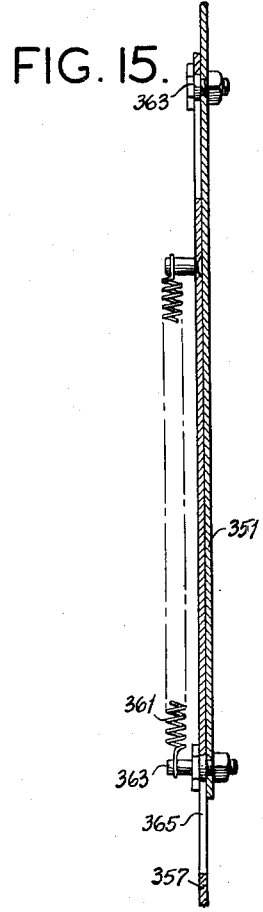
Fig. 15 is an enlarged detail section taken on line 15—15 of Fig. 14.

The crank shaft 339 is adapted to be rotated clockwise as viewed from the left through a quarter-revolution during each dispensing cycle from the left rocker plate 179 by means of a pawl and ratchet drive. This drive includes a ratchet 349 fixed on the left end of the crank shaft and a driving pawl 351 engageable with the ratchet when the gate 87 is closed. The ratchet comprises a disc 353 having four pins 355 spaced at 90° intervals and successively engageable by the pawl. The latter is adapted resiliently to engage the pins, being slidably mounted on a link 357 pivoted at 359 to the rocker plate 179 and biased in the direction toward the ratchet by a spring 361 (Fig. 15). The pawl is slidably mounted on the link by means of studs 363 extending from the pawl through elongate longitudinal slots 365 in the link. The spring 361 is connected at one end to one of the studs and at its other end to the link. The pawl extends through an aperture in an outturned flange at the forward edge of the left side panel 39 to maintain it in ratchet-engaging position.

The rocker plate 179 oscillates once during each dispensing cycle, as will be made clear. During its oscillation, it drives the pawl forward to rotate the ratchet through a quarter-revolution, then retracts the pawl so that it moves into posiion behind he next pin on the ratchet. Upon each quarter-revolution of the ratchet and the crank shaft 339, one of the magazines is swung back and forth. The arrangement is such that the magazines operate in succession from right to left. A match book is dispensed from any one magazine only once for every four dispensing cycles. If any match book should become jammed and prevent a magazine from swinging, the pawl yields against the bias of spring 361 to prevent breakage.

Figure 16:
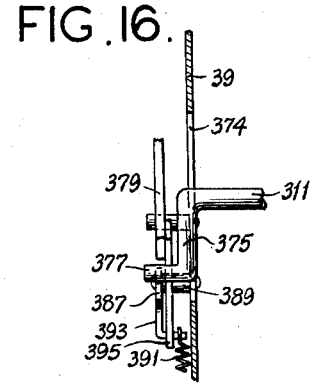
Fig. 16 is an enlarged detail section taken on line 16—16 of Fig. 14.

The kicker shaft 311 is spring-loaded and controlled from the left rocker plate 179. It is loaded by a spring 371 connected to a radial arm 373 on its right end (Fig. 5). At its left end, which extends through an aperture 374 in the left side panel 39 when the gate is closed, it is bent to have a radial trip arm 375 (Fig. 17). The trip arm is bent back at its outer end to have a finger 377 (Fig. 16). A loading link 379 is pivotally connected at 381 to the rocker plate 179 and guided for movement toward and away from the finger 377 by means of a stud 383 extending from the left side plate 39 through an elongate longitudinal slot 385 in the link. When the loading link is driven toward the trip arm by the rocker plate, its forward end comes into engagement with finger 377 and rocks the trip arm and the kicker shaft 311 counterclockwise as viewed from the left. This tensions the loading spring 371. The trip arm is latched in loaded position by means of a latch 387 pivoted at 389 on the left side plate 39 and biased upward toward latching engagement with the trip arm by a spring 391. The arrangement is such that when the loading link has rotated the trip arm to full loaded position, the latch is pulled upward by the spring 391 behind the trip arm finger 377 and maintains the arm and kicker shaft in loaded position (Fig. 14). The latch has a trigger 393 actuable by a finger 395 on the forward end of the loading link. When the loading link is retracted by the rocker plate, finger 395 engages the trigger as it nears its fully retracted position and pivots the latch downward, out of latching engagement with the trip arm (Fig. 17). This releases the latter, the kicker shaft and the kicker plate, and the latter snaps upward under the bias of spring 371 to impel a match book upward.

The motor 167 is connected across a power supply circuit 401 in a line 402 including a lock-bar-controlled motor switch 403 (Fig. 23). The relay coil 235 is connected across the power supply circuit in a line 404 including a push-button controlled switch 405 and a coin-controlled switch 406. The latter is closed in response to deposit of the required amount in coin, as will be readily understood. The switch 403 is mounted within the channel 85 for actuation by the lock bar 215. It has a resilient operating arm 407 biased to switch-opening position, and adapted to be moved to switch-closing position upon movement of the lock bar to the right when the latch 233 is released by a pin 408 on the lock bar engaging the arm (Fig. 13). The switch 405 is mounted on the upper flange of the channel 85. It has a resilient operating arm 409 inherently biased to switch-opening position. At N is shown another lock-bar-controlled switch. This switch is a part of the change-making mechanism. Its function is described in my aforesaid copending application. The arm 409 is adapted to be moved against its bias to close the switch by the generally vertical flange 410 of an angle bar 411 which is pivoted to rock about an axis substantially in line with its apex by means of pivot pins 412 (Fig. 12). The generally horizontal flange 413 of the angle bar extends under the lower ends of all the fingers 81. When any finger 81 is pushed down, it engages the flange 413 of the angle bar, and rocks the bar counterclockwise as viewed from the right to swing the flange 410 toward the operating arm 409 to close the switch 405.

To increase the storage capacity of the machine, auxiliary package magazines 421 are provided for carrying extra stacks of packages to be dispensed when the stacks in the primary magazines are exhausted. As shown herein, such auxiliary magazines are provided for the five primary magazines at the right of the machine, but are not provided for the four primary magazines at the left of the machine to allow space for the match book dispenser (Fig. 3). Each auxiliary magazine has a rear or back wall 423, side walls 425 spaced to fit between the side walls of the primary magazines, and inturned flanges 427 at the forward edges of the side walls constituting means at the front to retain packages therein (Fig. 7). It is open at the bottom. The flanges terminate short of the upper end of the auxiliary magazine and the upper edges of the side walls are inclined upward toward the back wall as indicated at 429. The depth of the auxiliary magazine from the flanges to the back walls is sufficient to accommodate a stack of long length packages and, in consequence, the auxiliary magazines will also accommodate stacks of standard length packages. At the upper end of the back wall of each auxiliary magazine is a hook 431 whereby it is pivotally and quick-detachably suspended from the rod 45. The height of the auxiliary magazine from its lower end up to the hook is less than the distance from the upper edge of the flange 49 on the plate 47 so that the auxiliary magazine can swing into the primary magazine with which it is associated.

Each auxiliary magazine is normally retained in a retracted forward generally vertical position in front of its respective primary magazine by engagement of its back wall 423 with the stack of packages in the respective primary magazine. When the stack in the primary magazine is exhausted, however, the auxiliary magazine may swing rearward into the primary magazine to a rearward position wherein it inclines into the primary magazine with the stack of packages in the auxiliary magazine positioned for dispensing. The auxiliary magazines are biased rearward by spring-loaded levers 424 pivoted on a transverse rod 426 mounted at its ends in the right gate member 93 and the frame plate 291. The lower ends of the levers engage plates 429 on the front of the auxiliary magazines adjacent their lower ends. The levers are biased into engagement with the magazines by springs 431 connected between their upper ends and a spring connector plate 433 carried by member 93 and frame plate 291. When the auxiliary magazines are in retracted position, the stacks of packages therein are supported on tracks 435 on the plate 47. As an auxiliary magazine swings rearward, the lowermost package in the stack therein slides rearward on the tracks. The curved upper end 75 of the panel 73 and the curved guide plates 76 constitute means fixed in position above the upper ends of the primary magazines obstructing access thereto. Accordingly, the primary magazines must be loaded from the front, and are adapted for such loading.

With the auxiliary magazines biased rearward, they exert pressure on the stacks of packages in the primary magazines. This may tend to prevent the stacks in the primary magazines from dropping upon the discharge of the lowermost packages in the stacks. Consequently, means is provided to relieve the pressure exerted on the primary stacks by the auxiliary magazines during each dispensing cycle. As shown more particularly in Figs. 5, 10 and 18, this means comprises a rocker bar 437 carried by a transverse shaft 439 journalled at its ends in bearing brackets 441 mounted on the guide 163. On its right end, the shaft 439 is provided with a crank arm 443. A link 445 connects the right rocker plate 185 and the crank arm to oscillate the shaft 439 and the bar 437. Each auxiliary magazine is provided with fingers 447 which extend downward from the lower margins of their front flanges. These fingers are engageable by the bar 437 as it rocks forward to swing the auxiliary magazines forward to relieve the pressure on the primary stacks (Fig. 10). As the bar 437 rocks rearward, it clears the fingers so that any auxiliary magazine may swing rearward into the respective primary magazine if there are no packages left in the latter. The back wall 423 of each auxiliary magazine is slotted at its lower end, as indicated at 449, to accommodate the respective guide 55 (Fig. 8).

Operation is as follows:

At the termination of a dispensing cycle, all the trays 25 are in display position, being retained therein by the pins 79 on the shaft 77 and by the fingers 81, all of which are raised. Each tray carries a package P (assuming that none of the package magazines have previously been exhausted). The packages are visible to customers through the window 19. With all the fingers 81 raised, switch 405 is open. The coil 235 for the latch 233 is deenergized, consequently the latch is in lowered position latching the lock bar 215 in its leftward retracted position. With the lock bar in this position, switch 403 is open. The rocker plates 179 and 185 are in the initial position of their oscillatory cycle wherein the package discharge rod 151 is in its retracted position at the forward ends of the slots 153 in the side panels 39 and 41 (Figs. 17 and 18). The stud 257 on the crank arm 183 has just wiped off the finger 259 on the bar 241, so that the latter is in its raised retracted position with the stud 243 in engagement with the rubber stop 255. The cam roller 203 is at the upper end of the cam slot 199 in the cam plate 193 (Fig. 18). The bar 137 accordingly is in its lowered retracted position wherein it holds the trays 25 in display position. The kicker cam 205 on shaft 175 are in such angular position that the kicker shaft 71 has been released and the kickers 69 are in their upward released position (Fig. 18). The match book kicker loading link 379 is in its rearward retracted position, wherein its finger 395 is in engagement with the trigger 393 of the latch 387 and has released the latter (Fig. 17). Thus, the trip arm 375 of the match book kicker shaft 311 is released, and the match book kicker plate is in an upper leased position. The match book magazine driving pawl 351 is in retracted position.

Upon the deposit of the required amount in coins, the coin-controlled switch 406 is closed. The customer then pushes down the push button 21 which is in line with the desired package as viewed through the window 19. This drives down the respective finger 81, slide 83 and push rod 107. As the finger 81 moves downward, it is driven between two of the lockout plates 109 to prevent any other push buttons 21 from being pushed down. It also rocks the bar 411 to close the switch 405. With switches 406 and 405 closed, a circuit is completed through the solenoid coil 235. The coil being energized, the latch 233 is released, and the lock bar 215 is pulled to the right by the spring 231 to lock down the selected slide 83 and push rod 107 and the finger 81 on the slide. This holds switch 405 closed and also closes the switch 403 to energize the motor 167. Since the selected finger 81 is locked down by the lock bar, it is unnecessary to continue holding down the push button 21, and the latter may be released.

The motor thereupon drives the gear 173 clockwise as viewed in Fig. 17. This rotates the transverse shaft 175 clockwise and, through the link 177, rocks the rocker plate 179 clockwise. It rotates the crank arm 183 on the left end of shaft 175 counterclockwise, as viewed in Fig. 18, and the crank arm, through the link 184, rocks the rocker plate 185 counterclockwise, as viewed in Fig. 18, in unison with the rocker plate 179.

As the rocker plates rock as above described through the initial half of their oscillatory cycle, the links 189 and 191 pull the package discharge rod 151 toward the rear of the machine. Since the selected push rod 107 is locked down, it holds the respective detent finger 159 down so that the respective pusher 155 is tilted upward to package-discharging position. The pusher engages the forward end of the lowermost package in the magazine containing the selected brand and pushes this package rearward on the tracks 51 to discharge it from the magazine. Meanwhile, the shaft 175 is rotated to rotate the kicker cams 205 and thereby to rock the kicker shaft 71 and retract the kickers 69. Ultimately, the discharged package slides down the rearward curved portion of the tracks and is vertically supported endwise upon the kicker 69 for the respective magazine (Fig. 8).

As the rocker plate 185 rocks counterclockwise through the initial half of its oscillatory cycle, the roller 203 thereon rocks the cam plate 193 clockwise as viewed from the right. This lifts the bar 137, raising the stud 135 on the bar, and permitting the spring 133 to rotate the shaft 77 counter-clockwise as viewed from the right, thereby to swing the pins 79 away from under the trays 25. This permits the tray carrying the selected package to tilt downward, and discharge the package into the delivery chute 27, through which it drops into the receiver 29. Discharge of the package is facilitated by tongues 149, which push the package forward off the tray. While all the pins 79 are swung away from under the trays 25, none of the trays other than the one carrying the selected package will tilt, being retained in display position by the fingers 81.

As the left rocker plate 179 rocks clockwise through the initial half of its oscillatory cycle, it drives the match book kicker loading link 379 forward (Fig. 14). This rocks the kicker trip arm 375 counter-clockwise as viewed from the left to rotate the kicker shaft 311 in the same direction. This moves the kicker plate 307 downward in the kicker chute and loads the kicker spring 371. As the loading link 379 moves forward, the finger 395 moves clear of the trigger 393 of the latch 387 to permit the latter to be pulled upward by its spring 391. When the rocker plate 179 has swung through the initial half of its cycle, the latch 387 snaps behind the trip arm finger 377 and holds the kicker in loaded position against the bias of the kicker spring 371. Meanwhile, the match book magazine driving pawl 351 is driven forward to rotate the crank shaft 339 through a quarter-revolution, thereby causing one of the match book magazines to swing rearward and then forward to discharge a match book into the kicker chute, wherein it drops upon the kicker plate 307.

After the gear 173 has rotated through half a revolution from its initial position, the motion of the rocker plates 179 and 185 is reversed and they rock back through the final half of their oscillatory cycle to their initial position. As they do so, the links 177 and 184 drive the package discharge rod 151 toward the front of the machine. This moves all the pushers 155 back to their retracted position in readiness for the next dispensing cycle. As the rocker plate 185 returns to its initial position, the roller 203 thereon rocks the cam plate 193 counterclockwise as viewed from the right to lower the bar 137. This pulls the stud 135 down against the crank arm 131 of the shaft 77 and rocks the shaft clockwise to swing the tray-controlling pins 79 upward. This raises the tray 25 from which the package has just been discharged back to display position.

As the rocker plates approach their initial position, the package kicker cams 205 reach their angular position wherein they release the cam follower levers 207. The package kicker shaft 71 thereupon is quickly rotated counterclockwise as viewed from the right under the bias of springs 211 to snap the kickers 69 upward. The particular kicker 69 under the discharged package impels it upward. The remainder of the kickers also snap upward, but there are no packages for them to kick. The package is shot upward and is guided by 75 and 76 around the upper end of the magazine and on to the display tray 25, which has previously been swung back to display position as above described, where it is retained for subsequent dispensing.

As the left rocker plate 179 returns to its initial position, rocking counterclockwise as viewed in Figs. 14 and 17, it moves the match book kicker loading link 379 rearward. Although the link moves away from the kicker trip arm 375, the latter is retained in cocked position by the latch 387. As the rocker plate approaches its initial position, the finger 395 on the loading link engages the trigger 393 of the latch, swinging the latch downward to release the trip arm. The match book kicker shaft 311 thereupon is quickly rotated clockwise (as viewed in Fig. 14) under the bias of spring 371 to snap the match book kicker plate 307 upward. The match book in the kicker chute is thereby shot upward and guided around to the delivery chute 27, through which it drops into the receiver 29 along with the dispensed package.

Meanwhile, the shaft 175 has completed nearly a revolution and has rotated the crank arm 183 counterclockwise (as viewed in Fig. 18) through nearly a revolution and to a position wherein the stud 257 on the crank arm is about to engage the finger 259 at the lower end of the bar 241. As the shaft and the crank arm complete a revolution, the stud 257 engages the finger 259 and pulls the bar 241 down. As the bar moves down, the stud 243 at the upper end of the bar rocks the crank shaft 263 clockwise, as viewed from the front, to cause the crank arm 267 on the crank shaft to drive the lock bar 215 to the left. This opens the lock-bar-controlled switch 403 and stops the motor 167. The crank arm 183 comes to rest just after its stud 257 has wiped off the finger 259. Meanwhile, the bar 241 returns to its raised position. When the lock bar moves to the left, the selected slide 83 is released and biased upward to raised position by the respective spring 99. This raises the selected finger 81, releases the switch-operating bar 411, and opens the switch 405. This deenergizes the coil 235, and the lock bar latch 233 drops down to latch the lock bar in its retracted position in readiness for the next dispensing cycle. As the slide 83 is raised, pulls the respective push rod 107 upward to retracted position.

During each dispensing cycle, the rocker bar 437 is oscillated by the link 445 to swing the auxiliary magazines forward to relieve the pressure exerted upon the stack of packages in the primary magazines by the auxiliary magazines. This is timed to occur after the discharge of the lowermost package from a magazine so that the stack of packages in the magazine is free to drop downward. After the bar 437 has swung the auxiliary magazines forward, it rocks rearward to a position clear of the fingers 447 at the lower ends of the auxiliary magazines. If any primary magazine has been emptied, the respective auxiliary magazine may then swing rearward into the primary magazine so that the packages in the auxiliary magazine are positioned for dispensing.

To load the machine with packages, the cabinet is opened and the gate 87 swung open for access to the package magazines. To load any emptied primary magazine which is provided with an auxiliary magazine, the auxiliary magazine hanging down in front of the primary magazine and obstructing access to the primary magazine for loading must of necessity be removed. This is accomplished by raising the auxiliary magazine to lift its hook 431 above the rod 45, and then tilting the upper end of the auxiliary magazine forward and lifting it out. This inherently results in any packages which are left in the auxiliary magazine dropping into the primary magazine so that they will be the first to be dispensed. Thus, loading in such manner that packages will not remain in the machine for overlong periods and become stale is insured.

Cross reference under rule 78 is made to my copending divisional application entitled Article Dispensing Apparatus, Serial No. 250,253, filed October 8, 1951.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A vending machine comprising a cabinet having a front door, a plurality of primary magazines in fixed position side-by-side within the cabinet for holding supplies of articles to be dispensed in upright stacks, each primary magazine having side walls extending from front to rear of the cabinet and a back wall and being open at the front toward the door, each magazine being adapted for loading from the front when the door is open, an open-bottomed auxiliary magazine for at least one of the primary magazines for holding a reserve supply of articles in an upright stack, said auxiliary magazine having a back wall, side walls spaced to fit between the side walls of the primary magazine and means at the front to retain articles therein, said auxiliary magazine being quick-detachably pivoted at its upper end to the upper end of the primary magazine for swinging movement from a forward generally vertical position in front of the primary magazine wherein the back wall of the auxiliary magazine is engageable with the forward ends of articles stacked in the primary magazine to a rearward position wherein it inclines into said primary magazine upon a reduction in height of the stack in the primary magazine below the elevation of the lower end of the auxiliary magazine, said auxiliary magazine being biased rearward for engagement of its back wall with articles stacked in the primary magazine and also to swing to said rearward position, means fixed in position above the upper end of the primary magazine and obstructing access thereto, said auxiliary magazine hanging downward in front of and obstructing access to the primary magazine and being readily detachable from the primary magazine to obtain access thereto when the cabinet door is open by raising the auxiliary magazine, tilting it forward and lifting it out, in consequence of which any and all packages left in the auxiliary magazine drop into the primary magazine, and stack-supporting means extending forward from the primary magazine for supporting a stack of articles in the auxiliary magazine when the latter is in its said forward position.

2. A vending machine as set forth in claim 1 wherein the quick-detachable pivot for the auxiliary magazine comprises a hook at the upper end of the back wall of the auxiliary magazine engaged over a rod extending transversely between the side walls of the primary magazine adjacent its upper front corner.

3. A vending machine as set forth in claim 1 wherein the back wall of the primary magazine is inclined from the upper end of the magazine toward the open front thereof, the magazine thereby being adapted to hold articles in a stack inclined downward and forward toward the front of the cabinet.

4. A vending machine as set forth in claim 1 wherein the back wall of the primary magazine is mounted for forward and rearward adjustment to accommodate packages of different size.

BENJAMIN W. FRY.

REFERENCES CITED

The following references are of record in the file of this patent:

UNITED STATES PATENTS

| Number | Name | Date |
| --- | --- | --- |
| 491,323 | Slater | Feb. 7, 1893 |
| 918,886 | Mills | Apr. 20, 1909 |
| 725,317 | Cody | Apr. 14, 1903 |
| 1,010,231 | Caille et al. | Nov. 28, 1911 |
| 1,666,849 | B. L. Fry | Apr. 17, 1928 |
| 1,679,458 | Williams et al. | Aug. 7, 1928 |
| 2,197,633 | Du Grenier | Apr. 16, 1940 |
| 2,205,192 | B. W. Fry | June 18, 1940 |
| 2,239,196 | Lunvik | Apr. 22, 1941 |
| 2,272,682 | Srodulski | Feb. 10, 1942 |
| 2,309,802 | Vogel | Feb. 2, 1943 |

FOREIGN PATENTS

| Number | Country | Date |
| --- | --- | --- |
| 372,081 | Great Britain | May 5, 1932 |